July 16, 1935.  B. E. LAWRENCE  2,008,106
FOOD AND BEVERAGE MIXER
Filed July 30, 1934
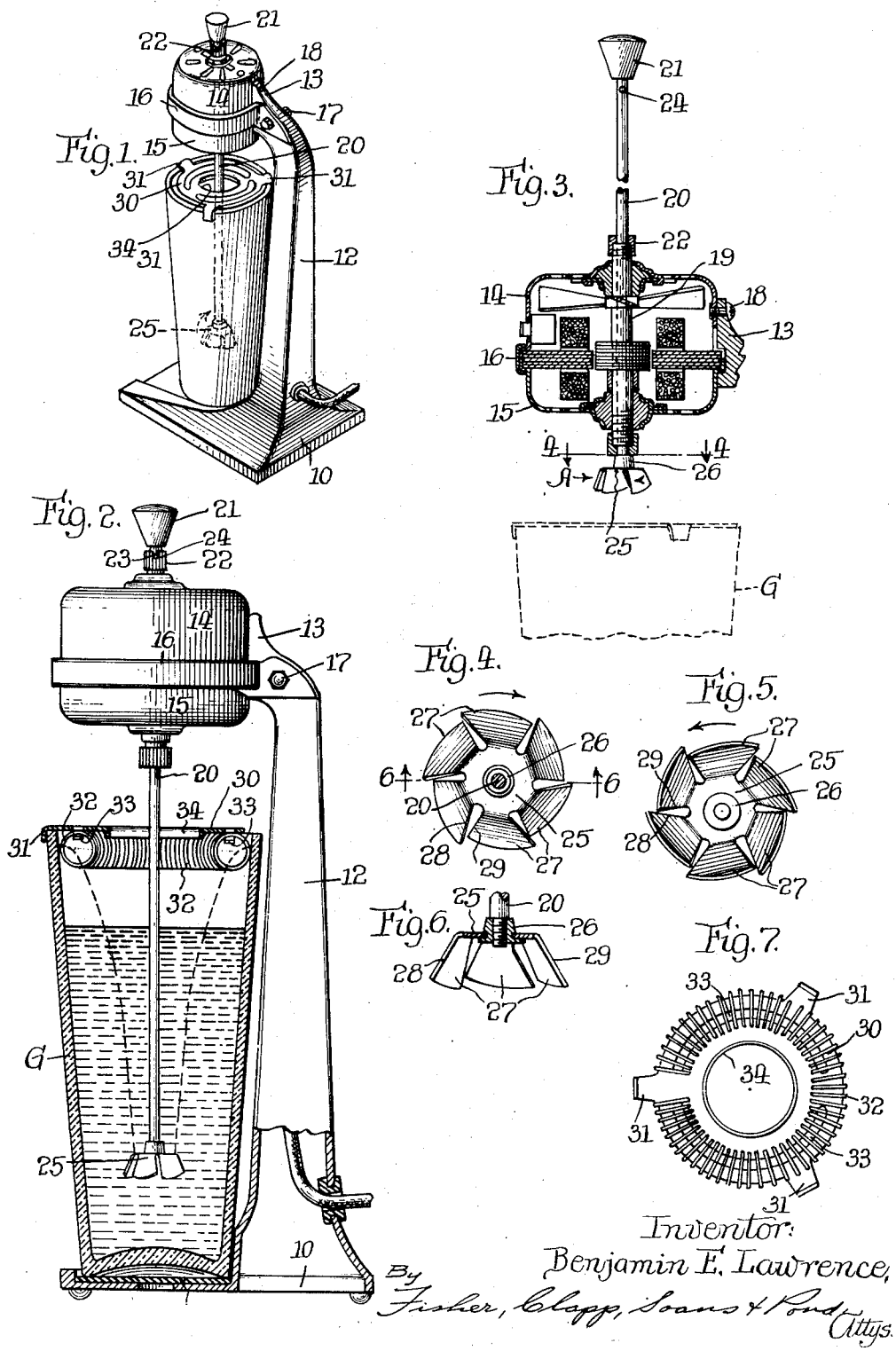
Inventor:
Benjamin E. Lawrence,
By Fisher, Clapp, Soans & Pond
Attys.

Patented July 16, 1935

2,008,106

UNITED STATES PATENT OFFICE 2,008,106

FOOD AND BEVERAGE MIXER

Benjamin E. Lawrence, Chicago, Ill.

Application July 30, 1934, Serial No. 737,489

6 Claims. (Cl. 259—108)

This invention relates to food and beverage mixers of the type extensively used at soda fountains and other places where liquid foods and soft drinks are sold, and has reference more particularly to a known type of mixer which comprises a suitable standard formed with a base to seat a glass or other container, an electric motor mounted on the upper end of the standard above the base, and a mixer rod or shaft extending through a hollow armature shaft of the motor and equipped on its lower end with an agitator for stirring the contents of the glass, the rod being slidable in the armature shaft so that it can be raised to carry the agitator above the top of the glass to permit the application and withdrawal of the latter.

One object of this invention is to provide, in a mixer of this type, an improved agitator that will more thoroughly and effectively stir and mix the contents of the glass. The improved agitator is of such form and structure as to force the contents of the glass upwardly in the latter causing the mixture to whirl and rise along the inner surfaces of the glass in the general form of an inverted hollow cone; and another object of the invention is to provide a device in the nature of a whirl-arrester applicable to the top of the glass which serves primarily to interrupt the whirling action of the liquid and prevent it from being thrown out of the glass.

The nature of the invention and the advantages inhering therein will be more fully understood by reference to the following detailed description, taken in connection with the accompanying drawing wherein I have illustrated one practical and approved embodiment thereof, and in which:—

Fig. 1 is a perspective elevation of the complete device, showing the same in working relation to a glass containing the liquid to be stirred or mixed.

Fig. 2 is an enlarged side elevation, with the glass in vertical section, illustrating the action of the rotating agitator and the whirl-arrester on the liquid.

Fig. 3 is a vertical section through the motor, showing the agitator and its rod or spindle in elevated position above the glass.

Fig. 4 is a top plan view of the agitator, enlarged on the line 4—4 of Fig. 3.

Fig. 5 is a bottom plan view of the agitator.

Fig. 6 is a vertical section of the agitator on the line 6—6 of Fig. 4.

Fig. 7 is a bottom plan view of the whirl-arrester.

Referring to the drawing, 10 designates a base plate formed with a suitable seat 11 for a glass or other container G, and 12 is a standard rising from the base 10 and having at its upper end a lateral arm 13 to which the motor is attached. The motor, in the form herein illustrated, is a simple vertical electric motor, the casing of which comprises upper and lower shells 14 and 15 united by an annular clamp ring or band 16, the two ends of which are secured to opposite sides of the arm 13 by a bolt 17, the upper shell 14 being also secured to the arm 13 by a screw 18.

The motor is formed with a hollow armature shaft 19 that extends through suitable bearings in the upper and lower shells 14 and 15 and itself receives the vertically slidable agitator rod or spindle 20, this latter equipped on its lower end with an agitator or stirrer designated as an entirety by A and on its upper end with a suitable knob 21 for raising and lowering the rod. Screwed or otherwise secured on the upper end of the armature shaft is a collar 22 that, as shown in Fig. 2, is formed in its upper edge with a pair of opposed notches 23 adapted to seat a pair of opposed pins 24 on the rod 20, whereby the armature shaft is drivingly coupled to the rod when the latter is in its fully lowered position. This simple type of coupling between a hollow armature shaft and an agitator rod has heretofore been used by me in mixers of this general type, but I have found that with the ordinary paddle mixer the action of the paddle on the liquid is such as to raise the rod sufficiently to disconnect the coupling and thus arrest the stirring action. The improved form of agitator next to be described, when working, exerts a down pull on the rod and thus maintains the coupling intact.

The improved agitator is most clearly shown in the detail views Figs. 4, 5 and 6, and comprises a central horizontal flat body section 25 formed with a hub 26 by which it is keyed or otherwise secured to the shaft 20, and a ring of downwardly flaring blades 27 depending from the outer edge of the central body section 25. These blades are substantially flat, but are transversely inclined in their direction of travel to the horizontal plane in which they rotate, their trailing edges 28 being higher than their advance edges 29, so that, when the agitator is rotated at high speed in the direction indicated by the arrows, one effect of the agitator is to whirl the body of liquid in a combined upward, outward and forward direction, as illustrated in Fig. 2, the agitator exerting a screw action on the liquid, and the liquid rising in a whirling hollow mass on the internal surface of the glass G. This action effects a most thorough and intimate mixing and commingling of the contents of the glass.

I have found, however, that if the glass is overcharged with liquid, or filled too near to the top thereof, the agitator is apt to throw some of the liquid out over the top edge of the glass. To check this I have devised a device which I term a whirl-arrester that is best shown in Figs. 2 and 7 and comprises preferably a removable annular cap member 30 formed with three or more radial arms or clips 31 adapted to rest upon and embrace the top edge of the glass, and a spiral ring 32 mounted on the under side of the cap member 31 and adapted to snugly fit the interior of the upper portion of the glass. A simple manner of connecting the ring to the cap consists in threading the coils of the ring through depending arcuate loops 33 struck downwardly from the plane of the cap member. I have found that this device not only effectively checks or breaks up the whirling action of the liquid and prevents accidental slopping over the latter, but, when the glas has been removed, it also serves as a very efficient strainer to hold back ice, lemon, or orange seeds or other like particles designed to be excluded from the beverage as served. The central opening 34 of the whirl-arrester is of sufficient diameter to allow the passage therethrough of the agitator, so that the glass can first be charged with the ingredients, the whirl-arrester then placed thereon, the glass then seated on the standard 10, the agitator then lowered into the glass and operated, the agitator then withdrawn, and the glass removed.

When the agitator is of the type described which acts to raise the liquid in a hollow whirling mass on the inner walls of the glass, the cooperative check of the whirl-arrester to prevent slopping over will be readily seen.

I have herein shown and described one practical and approved embodiment of the invention, but it will be understood that specific structural variations and modifications may be resorted to within the spirit and purview of the invention as defined in the claims.

I claim:

1. In a mixer of the class described, the combination of a support, an electric motor mounted on said support, a depending rod driven by the armature of said motor adapted to enter a container for material to be mixed beneath said motor, an agitator on the lower end of said rod having blades so shaped and disposed as to whirl said material in a combined upward and outward direction in said container, and an annular whirl arrester adapted to be mounted on the top edge of said container, the central opening of said whirl arrester being large enough to permit said agitator to pass therethrough.

2. A specific embodiment of claim 1, wherein said whirl-arrester includes a spiral ring and means for supporting the same within the top of the container adjacent to the inner surface thereof.

3. A specific embodiment of claim 1, wherein said whirl arrester comprises a removable annular cap member for said container, and a spiral ring secured to the under side of said cap member and adapted to fit within the top portion of said container.

4. In a mixer of the class described, a rotatable agitator rod, and an agitator having a central horizontal body section secured to said rod and a ring of fixed lengthwise downwardly flaring blades depending from the outer edge of said body section, said blades being transversely inclined to their path of rotation and acting to exert a screw action on the material being mixed and whirl the latter in a combined upward and outward direction.

5. In a mixer of the class described, a rotatable agitator rod, and an agitator fast on said rod having a circular group of fixed substantially flat lengthwise downwardly flaring blades disposed with their trailing edges higher than their advance edges and with the trailing edge of each blade approximately overlying the advance edge of the next following blade.

6. In a mixer of the class described, the combination of a support, an electric motor mounted on said support, a depending rod driven by the armature of said motor adapted to enter a container for material to be mixed beneath said motor, an agitator on the lower end of said rod, and an annular whirl arrester adapted to be mounted on the top edge of said container, the central opening of said whirl arrester being large enough to permit said agitator to pass therethrough.

BENJAMIN E. LAWRENCE.